Aug. 31, 1948.  H. A. MOOMJIAN  2,448,149
COFFEE BREWING CONTROL
Filed Sept. 26, 1946
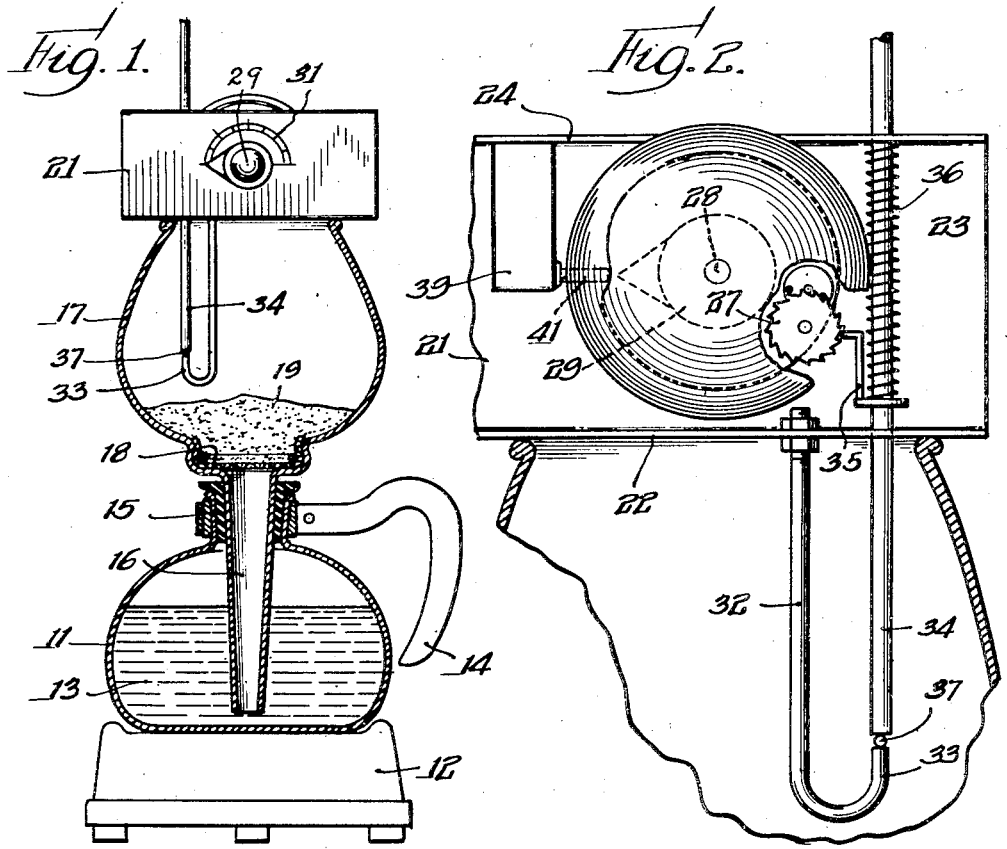
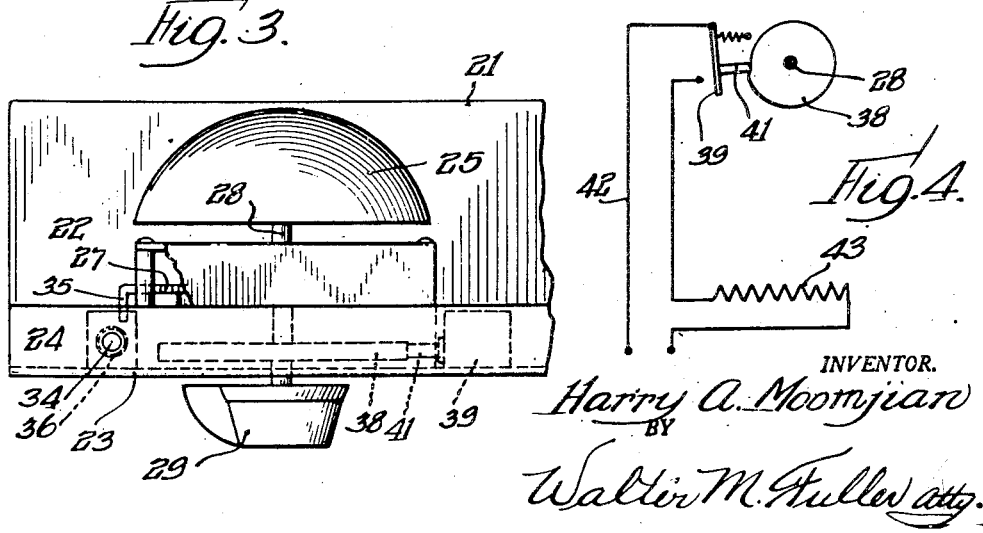
INVENTOR.
Harry A. Moomjian
BY
Walter M. Fuller atty.

Patented Aug. 31, 1948

2,448,149

UNITED STATES PATENT OFFICE 2,448,149

COFFEE BREWING CONTROL

Harry A. Moomjian, Los Angeles, Calif.

Application September 26, 1946, Serial No. 699,548

3 Claims. (Cl. 99—281)

The current invention pertains to certain novel and innovatory structural and functional betterments and advantages in means for automatically governing and regulating the brewing of coffee or the like, as for example, but not necessarily exclusively, in coffee-makers of the type having a lower, glass, water-heater connected to or associated with an upper, glass, container accommodating the ground coffee, so that the water in the under vessel, upon being adequately heated by suitable means to the boiling point, is automatically fed or forced up to the coffee in the upper vessel by the pressure developed in the lower bowl and the beverage brewing begins, such operation being terminated after having been continued for a predetermined period.

Devices or appliances of this general character have been on the market for some time wherein the timing of the coffee-brewing is started when the heat, electric or otherwise, is applied to the water in the lower bowl, but this type of device is not entirely satisfactory as different amounts of water in such bowl will vary the boiling time of the water.

Other styles of structure include regulating thermostats or floats, but these require many objectionable delicate parts which the coffee grounds tend to clog, the thermostatic forms having the undesirable characteristic that they lag in operation, by which is meant that they take a comparatively long time to function after the hot water reaches the upper bowl and comes into contact with the ground coffee, which is the moment the timing of the brewing should begin to efficiently and effectively automatically govern the brewing period.

The control appliance incorporating or embodying the present invention suitably and satisfactorily overcomes these deficiencies in that the coffee-brewing period regulator begins its action practically simultaneously with the initiation of the contact of the hot water with the body of coffee in the upper bowl or vessel.

One of the outstanding and paramount objects of this invention is, therefore, the provision of an apparatus which will accomplish this desirable result in an efficient manner and which will at the same time be simple in its structure, which is economical to provide, which will not be likely to be injured in service and which will preferably, but not necessarily, also indicate when the brewing has been completed.

In order, therefore, to enable those acquainted with this art to understand the new structure and novel manner of operation of an appliance incorporating this invention, a present preferred embodiment thereof has been fully illustrated in the accompanying drawing forming a part of this specification supplemented by the following detailed description thereof.

In this drawing:

Figure 1 shows the lower, water-containing bowl and its companion, upper, coffee-accommodating vessel in central vertical section with the superposed, new, control structure in elevation;

Figure 2 presents a portion of the upper bowl in section and the control appliance in elevation as viewed from the side thereof opposite that illustrated in Figure 1 and on a larger scale;

Figure 3 is a top plan view of the control device; and

Figure 4 shows diagrammatically the electric heating circuit.

Referring to this drawing, the under or bottom glass-bowl 11 is adapted to rest upon and be heated by an electric or other suitable type of heater 12 to have its contained water 13 raised to the boiling point, such vessel 11 being supplied or fitted with a suitable handle 14 by means of which it may be readily carried and manipulated with facility.

As is clearly illustrated, the top mouth of such container 11 is partially occupied by a hollow seal 15 adapted to removably or demountably accommodate the depending, tapered glass-tube 16 of the upper, complementary or companion glass-bowl 17 fitted with a fine grain filter 18 over the upper end of tube 16 and on which the ground coffee 19 to be extracted rests.

As far as hereinabove described, these two bowls and their contents are old and well known in the art, the heated water in the lower bowl when boiling and thereby creating a pressure in the under bowl causing the hot water to be gradually expelled up through the tube into the upper bowl where it encounters the coffee and extracts the essence therefrom, the completed liquid coffee drink descending through the filter and tube into the lower bowl by reason at least in part of a created suction therein, the coffee grounds remaining in the upper bowl separated from the drink now in the lower bowl, which completed coffee drink upon removal from the upper bowl, may be poured from the lower bowl into the cups for use.

The governing, regulating and announcing appliance includes, as shown, a supporting member 21 angle shape in vertical cross-section comprising a flat base 22, adapted to rest on the top of bowl 17 and having an upstanding wall 23 along the top edge of which is a narrow horizontal flange 26 parallel to the base 22.

Mounted on the back of wall 23 in any approved manner is a bell 26 within which is housed or enclosed a spring-operated clockwork including the notched or peripherally toothed escapement wheel 27, this clockwork being capable of being wound up by a suitably mounted shaft 28 extending forwardly through the wall 23 and equipped at its front end with a pointed handle 29 cooperating with a curved scale 31 on the face of wall 23 indicating by the position of the handle the amount that the clockwork has been wound up by the turning of the handle.

Such bell, clockwork and winding mechanism are known and when the heating of the lower bowl is started the clockwork is manually wound up by the handle a predetermined amount to obtain the desired strength of coffee product.

The clockwork gradually unwinds and, just before it completes its unwinding, it rings the bell and thereby directs attention to the fact that the proper brewing has been consummated.

My invention concerns the following described means for controlling the operation of the clock, the bell and the heating.

Mounted on and depending from the base 22 of the control mechanism is a stationary curved metal rod 32 having an upturned end 33 located in the lower portion of the interior of bowl 17 adjacent to the coffee.

Mounted in registered apertures of the two separated walls 22 and 24 is a straight metal rod 34 slidable vertically in register with the part 33 of the fixed rod 32.

Such rod 34 has a detent 36 fixed thereon and adapted to engage and to disengage teeth of the escapement-wheel 27 to lock it against rotation or to release it and permit its revolution, a coiled spring 36 being interposed between the top face of the detent and the under surface of the top wall 24 thus tending to lower the detent and permit the wound clockwork to unwind.

In order to prevent such unwinding until the hot water in the lower bowl begins its action on the coffee grounds in the upper bowl, the rod 34 is held elevated a slight distance against the action of its spring so that its detent engages one of the teeth of the escapement by a small water-soluble disc or pellet 37 interposed between the fixed abutment 33 and the movable rod 34.

As soon, therefore, as the hot water begins to reach the ground coffee this element 37 is very quickly dissolved by such water thus allowing the rod 34 to respond to the action of its spring and descend into contact with the abutment 33 thereby releasing the escapement and permitting the clock to initiate its unwinding, the period of such unwinding determining the time of coffee-brewing, the completion of which is announced audibly by the ringing of the bell.

Of course, it is essential that the material of the disc 37 shall not have any material effect upon its solution on the flavor of the coffee and a suitable material to be employed for this purpose is a very small or tiny lump of sugar, although, other materials can be employed for that purpose.

Whenever it is necessary to replace the dissolved disc by a new one for the purpose of separating the parts 33 and 34 for the attainment of the object previously stated, this is readily done by removing the controller from the top bowl and inserting the new disc in place, but this removal is also ordinarily necessary to insert the new supply of coffee for the next brewing operation.

In some cases, it is desirable also to terminate, reduce or modify the heat of the lower bowl upon the completion of the coffee-brewing action and this is accomplished by providing shaft 28 with a suitable shaped cam 38 operating a spring-opening electric-switch 39 having a member 41 coacting with the edge of the cam, such switch being in the electric-circuit 42 containing the electric-heater 43 of the member 12, which circuit can be plugged into an ordinary commercial electric circuit supplying the electricity.

Inasmuch as handle 29, shaft 28 and cam 38 are all fixedly connected and operative together, as soon as the handle 29 begins to be manually turned the shape of cam 38 is such that by its coaction with the member 41 switch 39 is closed thus starting the heater in operation which condition continues until during the unwinding of the clockwork, the cam is returned to its initial position illustrated in Figure 4 whereupon the switch automatically opens under the action of its spring thus terminating the heating of the appliance.

Obviously, this electric circuit may control other operations such as by closing the switch instead of opening one and an electric bell may be rung or instead of opening the circuit a resistance may be inserted to merely reduce the heat without actually terminating it.

Of course, the water-soluble disc or pellet must have no detrimental effect on the completed coffee drink and the amount of sugar in any one such agent does not appreciably modify the taste of the drink.

In fact, the pellet may be made of ground coffee particles bound together by a suitable soluble bonding medium.

Those acquainted with this art will readily understand that this inventon, as defined by the appended claims, is not necessarily limited and restricted to the precise and exact details herein above set forth and that reasonable modifications may be availed of without departure from the heart and essence of the invention and without the loss or sacrifice of any of its material benefits and advantages.

I claim:

1. In a coffee-brewing timing-appliance adapted for use with a coffee-brewer of known general type having a lower bowl, means to heat water in said bowl, an upper bowl having a conduit connection with said lower bowl to convey hot water from the lower bowl to the upper bowl and to conduct the extracted coffee fluid from the upper bowl to the lower bowl, and a filter to retain the ground-coffee in the upper bowl, said timing device having a spring-actuated clockwork, manually operated means to wind said clockwork varying amounts, and means to indicate the degree of winding of said clockwork, the new means to releasably lock said clockwork against initiating its unwinding until the introduced hot water comes into contact with the coffee in the upper bowl including the novel combination of an escapement-wheel rotatable with such clockwork, a fixed abutment adapted to occupy said upper bowl, a movable member incorporating means tending to cause it to engage said fixed abutment, a detent adapted to engage said escapement-wheel and prevent its turning and actuated by said movable member, and a water-soluble agent in said upper bowl having no detrimental effect on the finished coffee drink and located between said abutment and member to hold them apart and thereby render the lock active, said agent quickly melting when contacted by the hot water and allowing said member to move and engage said abutment thus releasing said detent from the escapement-wheel and initiating the unwinding of the clockwork, and means to terminate the heat application to the lower bowl upon completion of the unwinding of the clockwork.

2. The novel combination set forth in claim 1, in which said water-soluble agent is a sugar-pellet.

3. The novel combination set forth in claim 1 including in addition means to audibly indicate when said clockwork has completed its unwinding.

HARRY A. MOOMJIAN.

REFERENCES CITED

The following references are of record in the file of this patent:

UNITED STATES PATENTS

| Number | Name | Date |
|---|---|---|
| 578,059 | Hallas | Mar. 2, 1897 |
| 946,244 | Magaw et al. | Jan. 11, 1910 |
| 1,631,486 | Hyde | June 7, 1927 |
| 2,158,133 | Lemp | May 16, 1939 |
| 2,385,694 | Davis | Sept. 25, 1945 |